United States Patent [19]
Fischer et al.

[11] Patent Number: 5,158,308
[45] Date of Patent: Oct. 27, 1992

[54] DEVICE FOR CLAMPINGLY CENTERING

[75] Inventors: David Fischer, Aschaffenburg; Rudolf Kohlert, Stockstadt, both of Fed. Rep. of Germany

[73] Assignee: Römheld GmbH, Laubach, Fed. Rep. of Germany

[21] Appl. No.: 491,313

[22] Filed: Mar. 9, 1990

[30] Foreign Application Priority Data

Mar. 9, 1989 [EP] European Pat. Off. .......... 89104172

[51] Int. Cl.$^5$ ............................................. B23B 31/16
[52] U.S. Cl. .................... 279/121; 279/4.12; 279/110; 279/133
[58] Field of Search ................ 279/1 L, 1 J, 110, 121, 279/117, 1 H, 6, 1 DA, 1 DC; 33/644

[56] References Cited

U.S. PATENT DOCUMENTS 3,751,053  8/1973  Swanson ........................ 279/4 X

FOREIGN PATENT DOCUMENTS 8849 of 1887  United Kingdom ............... 269/107

Primary Examiner—Larry I. Schwartz
Assistant Examiner—Robert Schultz
Attorney, Agent, or Firm—R. H. Siegemund

[57] ABSTRACT

A centering and clamping device is provided which comprises a plurality of rod elements, a plurality of clamping slides and reversing and non-reversing transmission elements between the rod elements and clamping slides to convert motion of the rod elements into centering and clamping motion of the clamping slides. Each of the rod elements are in engagement with some of the other rod elements whereby movement of one rod element can transmit motion to at least one other rod element. Various arrangements of the rod elements, slides and transmission elements are disclosed to achieve centering and clamping.

12 Claims, 2 Drawing Sheets

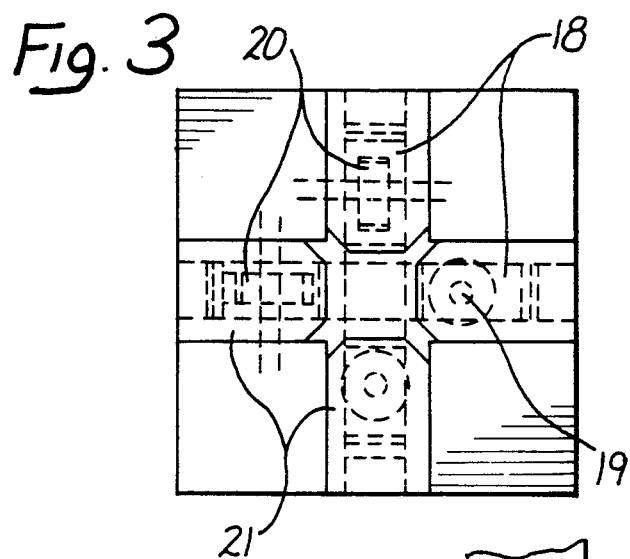
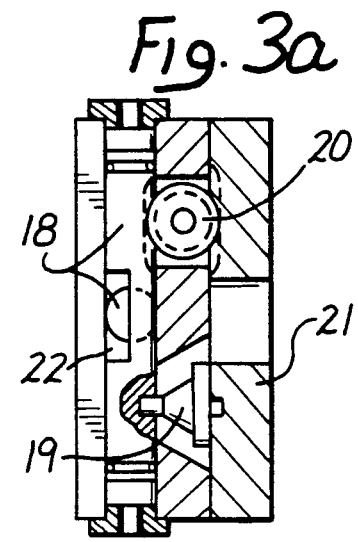
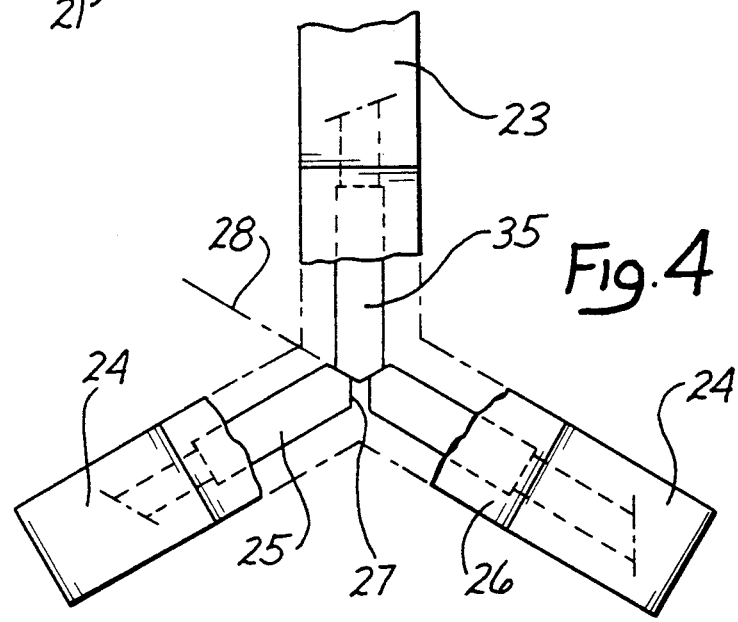
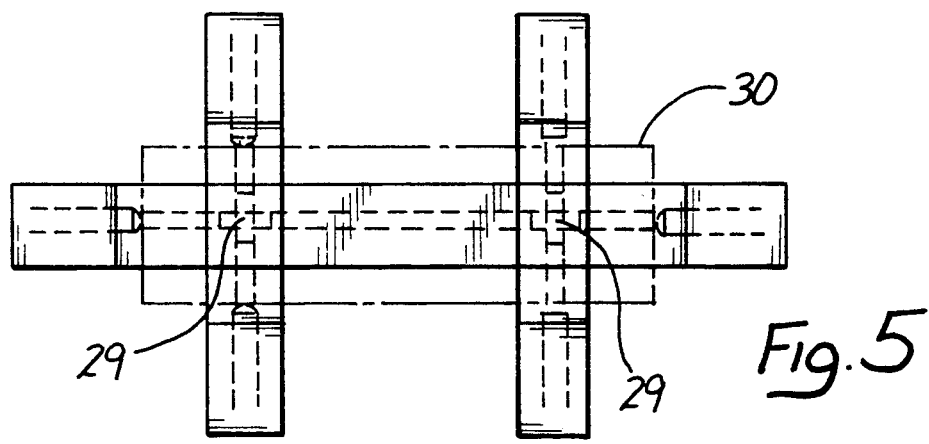

DEVICE FOR CLAMPINGLY CENTERING

BACKGROUND OF THE INVENTION

The invention relates to devices which clamp workpieces in a centering orientation for further working and more particularly the invention relates to devices with transmissions for longitudinal movement using rods, as they are known for centering vises. For the latter a rack is inserted in a housing which rack carries along a centering clamping slide directly and on one side while deflecting a second slide on the other side by means of a pinion.

Devices for the transmission of longitudinal movement using rods are used primarily for self centering clamping in a stationary fashion. Contrary to the known rotating machine chucks rod transmissions are very advantageous for this purpose since they can be of a simple construction, they can be kept low and an introduction of force is rather easy as it involves mostly a sideways lying, longitudinal movement rod.

The known centering vises have the large drawback that they are very inflexible in regard to any variability as well as concerning different lengths and for different arrangements of the respective direction of action. Thus their field of employment is quite limited.

With regard to longitudinal variability it is known to offset chuck brackets on the centering clamping slide. This way however the longitudinal variability can be only as large as the vise itself. Unfortunately one has to forgo the centering action for larger length since a very large vise is very expensive and quite annoying in the other cases.

Concerning variability of arrangement here often cases appear for which it would be quite advantageous to clamp in a centering fashion, in several intersecting directions and independent as to each direction. However the known centering vises do not cover these cases.

DESCRIPTION OF THE INVENTION

It is an object of the present invention to provide more universal and more attractive centering clamping in that a device for centering clamping is provided which combines constructional advantages such as simplicity, low height etc. with a large flexibility.

In accordance with the invention the object is attained in that the principle of centering clamping with longitudinal motion transmission by means of rods as is known per se is continued but supplemented by the features of the characterizing part of claim 1 according to which the centering clamping device preferably being power operated with opposing movement of centering slides deviates from a rigid two element position in that a longitudinal movement rod is subdivided into individual pieces which are variable and exchangeable single piece elements which in turn interconnect variably positioned housing parts which parts however remain stationary during the operation whereby in the various housing parts centering clamp slides are situated having motion reversing as well as nonreversing transmission elements which transmit movement of the individual elements upon the centering slides and/or are provided with intersecting individual elements which move independent from each other and wherein respective motion reversing as well as nonreversing transmission elements are provided which transmit the motion of individual pieces upon the centering clamping slide.

In summary there is a separation of the longitudinal motion rod into variable exchangeable as well as intersecting individual elements which permits flexible arrangement particularly in combination with variable housing parts as well as motion reversing and nonreversing transmission elements.

Advantageous configuration of the invention are stated in the dependent claim which configurations will later be described with reference to the drawings. By means of the invention the advantages on one hand of the employed principle of motion by means of rods, namely, low construction height simple force actuation and simple construction can be combined with a following:

size variability;

the arrangement of variable single piece elements into which the longitudinal motion rod is divided can be combined with individual housing parts which in turn permit flexible extension of the centering clamping into any kind of extreme magnitudes while on the other hand, for small workpieces, the space requirements can be shrunken completely.

If the motion rod is divided into intersecting elements then one can extend e.g. a four element or a six element clamping structure in an unlimited fashion which amounts to an unknown degree of flexibility. Still everything is constructed from similar parts of the most simple configuration which in turn renders invention more economical.

Any kind of combination can be obtain by means of the subdivided longitudinal motion rod elements as well as housing parts as far as variations in position of the central clamping slides are concerned. Of particular interest is a four element arrangement with independent directions of motions. This permits centering of workpieces which are completely inaccurate as far as fitting is concerned and which corresponds to the basic meaning of centering in the first place, namely eliminating tolerances as far as the determination of the center of the workpiece is concerned.

Variability in height; the subdivision of the longitudinal motion rods into variable individual elements as well as of the housing into individual parts permits utilization of the same configuration of differently high housing parts which have in each instance such a height transmission so that tilting movements will not be exerted on the centering clamping slide which moments will be attributable to undue height.

Low level workpiece support even in the case of four or six element configuration of the centering clamping slides the only height level needed underneath the workpiece is given by the intersection rod pieces transmitting the longitudinal motion, particularly for noncontact machines this saving in space is very important.

DESCRIPTION OF THE DRAWINGS

With reference to the drawing several examples and embodiments of the invention will be described. Here is shown in FIG. 1 a longitudinal section of a two element arrangement being variable in accordance with the invention;

FIGS. 3 and 3a are respectively a top elevation and a section of a fixed four chuck configuration;

FIG. 4 is a top elevation of variable three chuck configuration;

FIG. 5 is a top elevation of a variable six chuck configuration;

Figure 1:
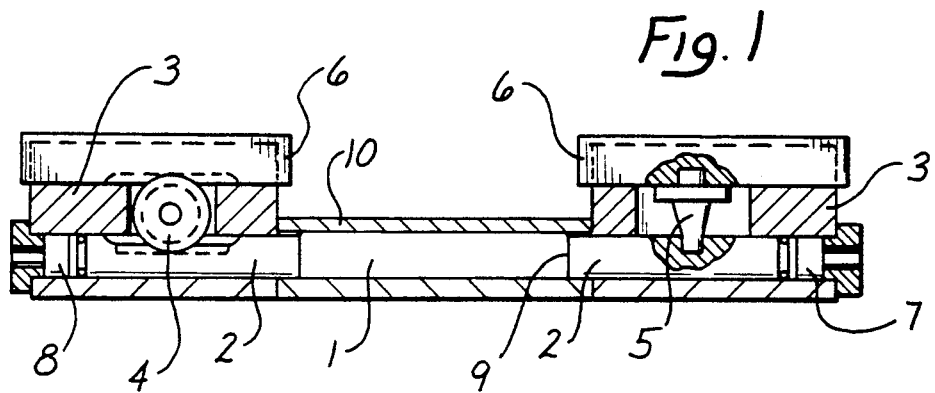

A lying longitudinal motion rod 1, 2 is subdivided in FIG. 1 into individual elements and has obtained therewith variably exchangeable individual elements 1. They interconnect individually, variably arranged housing parts 3 which remain stationary during the centering clamping function. In the left hand housing part a pinion 4 is provided as a motion reversing element; in the right hand housing part a pin 5 is provided as a nonreversing element and a centering clamp section 6 is situated in both housing parts.

The arrangement is actuated by means of force whereby longitudinal motion rod elements 2 as situated in the housing parts, are configured as hydraulic pistons. For adjusting for purposes of clamping oil is pumped into the oil chamber 7 of the right hand housing element, and for retraction oil is pumped into the chamber 8 of the left hand housing element. The longitudinal motion rod elements 1 and 2 are configured as thrust rods with simple push connection 9 and are enclosed and guided by means of variable tunnel elements to prevent buckling as well as soiling. The arrangement illustrated here permits extension to any size even though the configuration is of the most simple nature.

Figure 2:
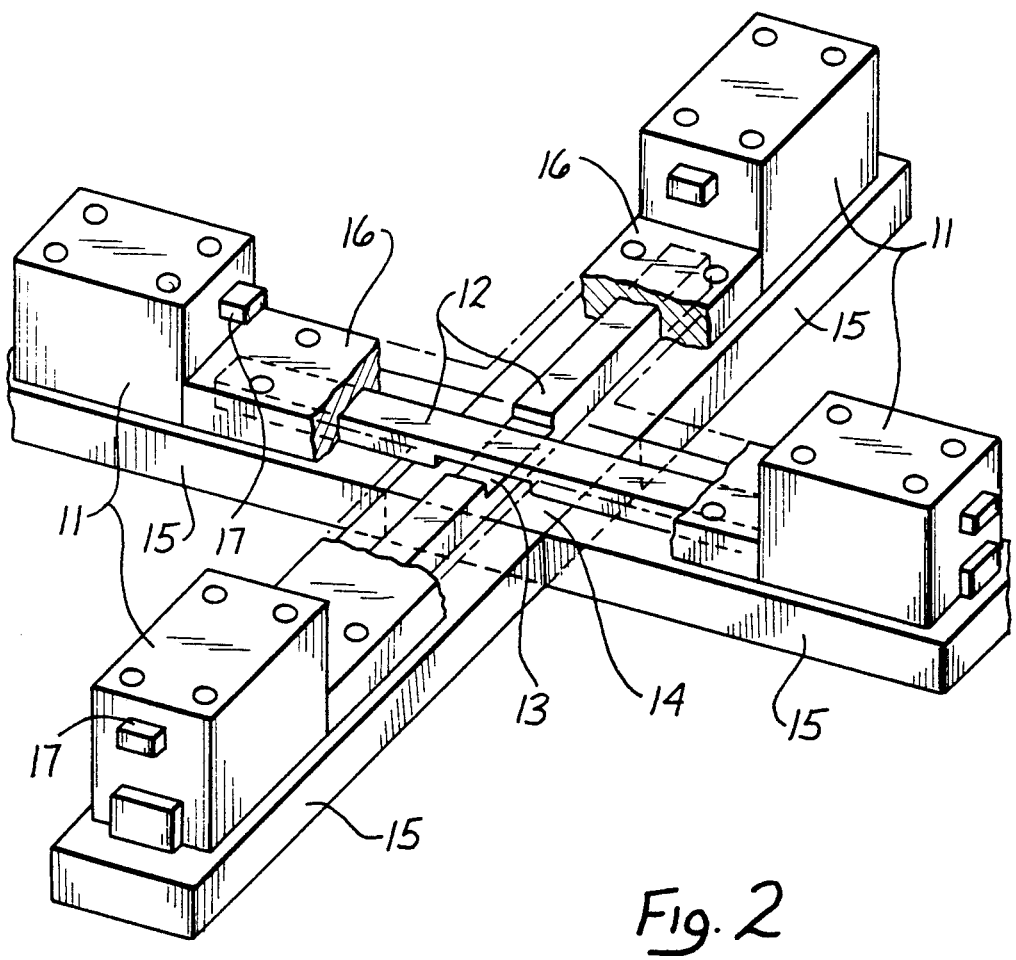
FIG. 2 is the perspective view of a variable four chuck configuration.

FIG. 2 are illustrated four variably arrangable housing parts 11 with variably exchangeable and intersecting longitudinal motion rod elements 12. The intersecting elements and therefore the motions are independent from each other and thus permit independent centering from two sides. In order to permit the work piece to be still shiftable by means of one centering clamping slide pair even after it has been gripped by the other pair the force exertion as far as the intersection is concerned must be pressure dependently interconnected. The intersection of the longitudinal motion rod is in addition provided with superimposed cut outs 13 and are situated on a connecting piece 14 which is bolted to four raster plates 15. Variable tunnels 16 are schematically indicated above the aforementioned parts.

For centering clamping on the inside as well as on the outside, the centering clamping slides 17 extend from both sides. The workpiece can abut at a low level because only the moving rods 12 run underneath the work piece and the housing part 11 is arranged on the outside. Furthermore different heights can be accommodated with differently high housing parts without exerting tilting moments upon brackets that may be rather high. Similar to the illustrated arrangement any kind of variation in size and combination is attainable by means of the invention.

FIGS. 3 and 3a illustrate intersecting separated longitudinal motion rod elements 18 on which respective motion reversing 20 and nonreversing 19 elements are provided which conduct the movement upon the centering clamping slides 21. The rod elements are directly configured as hydraulic pistons and can be moved independently from each other. Just as described above the force conduction and exertion on the two pieces have to be mutually dependent on pressure.

Cutouts 22 are provided in superimposing fashion in the intersection as was outlined above. An intersection of longitudinal motion rod elements may be configured from individual superimposed shiftable rings if in the center of the device one needs a passage opening.

The usual slip-on brackets are bolted onto the centering clamping slides. Even though such a bracket chuck has only the usual smaller variability in size, it is still recommended owing to its simple configuration and the two independent centering directions.

Individually variable housing elements 23 and 24 are situated, as per FIG. 4 in a regular three element configuration. Analogously any kind of irregular arrangement is feasible. Three variable thrust rod pieces 25 enclosed by tunnels 26 intersect in rooflike oblique ends 27 and transmit equal path-length since their respective angle is determined by the angle bisector 28. The clamping closing mot on is exerted on one of the elements such as 23 and the retracting motion on the other one 24.

The arrangement in FIG. 5 is provided with two intersections 29 and is constructed from elements as described above and is provided to demonstrate the flexible employment of the arrangement even for long workpiece such as 30.

We claim:

1. Centering and clamping device comprising:
a plurality of exchangeable rod elements;
channel means for receiving the rod elements such that the rod elements are slidably positioned in the channel means for respective radially, outward and inward sliding therein toward and away from a common center;
a plurality of housing elements, interconnected by the channel means;
a plurality of clamping slides respectively on the housing elements mounted for radially inward and outward sliding movement toward and away from a common center;
the clamping slides as well as the housing elements being spaced apart by the channel means; and
at least one motion reversing transmission element and at least one nonreversing transmission element, respectively connecting the slides with rod elements of the plurality of rod elements, so that simultanious radially inward movement of all said clamping slides results from radial outward movement of some of said rod elements and radial inward movement of the remainder of the rod elements and vice versa for simultanious radially outward movement of the clamping slides.

2. Centering and clamping device as in claim 1 wherein at least one of the rod elements is configured as aforce actuated piston.

3. Centering and clamping device as in claim 1 including force actuating means for clamping adjustment, the force being introduced from one side of the interconnected longitudinal motion rod elements, and means for providing retraction on an opposite side of the interconnected rod elements.

4. Centering and clamping device as in claim 1 the rod elements being configured as thrust rods with simple push connection.

5. Centering and clamping device as in claim 1 the channel means being enclosed by variably positioned tunnel covers.

6. Centering and clamping device as in claim 1 the motion reversing and nonreversing transmission elements being respectively pinions and pins.

7. Centering and clamping device as in claim 1 the clamping slides projecting from the respective receiving housing elements.

8. Centering and clamping device comprising:
a plurality of exchangeable rod elements;

channel means defining intersecting channels for receiving the rod elements such that the rod elements are slidably positioned in the channel means for respective radially inward and outward sliding therein toward and away from a common center;

a plurality of housing elements, interconnected by the channel means;

a plurality of clamping slides respectively on the housing elements mounted for radially inward and outward sliding movement toward and away from a common center;

the clamping slides as well as the housing elements being spaced apart by the channel means; and at least one motion reversing and one nonreversing transmission elements, respectively connecting the slides with rod elements of the plurality of rod elements, so as to obtain movement of two slides towards and away from each other upon a combination of both radially inward and outward sliding movement of the rod elements.

9. Centering and clamping device as in claim 8 two rod elements of the plurality having cutouts (13) for permitting noninterfering intersecting of them and therefore independent movement.

10. Centering and clamping device as in claim 8 the channel means including raster plates being interconnected under utilization of connecting pieces.

11. In a centering and clamping device, comprising:
a plurality of exchangeable rod elements;
channel means defining intersecting channels for receiving the rod elements such that the rod elements are slidably positioned in the channel means for respective sliding therein and as to each element individually;

at least some of the rod elements having an end with an oblique surface, the ends of the rod elements having such oblique surface engage each other for the transmission of motion wherein at last one of the rod elements moves towards a common center and at least one other rod element moves away from that center;

a plurality of housing elements, interconnected by the channel means;

a plurality of clamping slides respectively on the housing elements mounted for radially outward and inward sliding movement toward a common center the clamping slides as well as the housing elements being spaced apart by the channel means; and means including reversing and non-reversing transmission elements for respectively connecting the slides with rod elements of the plurality of rod elements.

12. Centering and clamping device as in claim 11 the separated longitudinal motion rod elements having oblique ends, engaging each other and wherein the angle bisector between respective two engaging rod elements determines the angle of the oblique ends.

* * * * *